US011978229B2

(12) United States Patent
Fleider et al.

(10) Patent No.: US 11,978,229 B2
(45) Date of Patent: May 7, 2024

(54) SYSTEM AND METHOD FOR THREE-DIMENSIONAL LOCALIZATION OF AN OBJECT

(71) Applicant: Vidisco Ltd., Or Yehuda (IL)

(72) Inventors: Alon Fleider, Modi'in (IL); Ohad Milo, Kiryat Ono (IL)

(73) Assignee: Vidisco Ltd., Or Yehuda (IL)

( * ) Notice: Subject to any disclaimer, the term of this patent is extended or adjusted under 35 U.S.C. 154(b) by 0 days.

(21) Appl. No.: 18/143,417

(22) Filed: May 4, 2023

(65) Prior Publication Data
US 2023/0360249 A1 Nov. 9, 2023

(30) Foreign Application Priority Data
May 4, 2022 (IL) .......................................... 292783

(51) Int. Cl.
*G06T 7/00* (2017.01)
*G01N 23/083* (2018.01)
*G01N 23/10* (2018.01)
*G06T 7/30* (2017.01)
*G06T 7/70* (2017.01)

(52) U.S. Cl.
CPC ............. *G06T 7/70* (2017.01); *G01N 23/083* (2013.01); *G01N 23/10* (2013.01); *G06T 7/30* (2017.01); *G06T 2207/10028* (2013.01); *G06T 2207/10116* (2013.01); *G06T 2207/30004* (2013.01)

(58) Field of Classification Search
None
See application file for complete search history.

(56) References Cited

U.S. PATENT DOCUMENTS

| 2007/0019787 A1* | 1/2007 | Zuckier | G01N 23/04 378/63 |
| 2015/0164607 A1* | 6/2015 | Ruijters | G06T 19/20 382/132 |
| 2018/0279883 A1* | 10/2018 | Navab | A61B 6/5247 |

* cited by examiner

*Primary Examiner* — Hoon K Song
(74) *Attorney, Agent, or Firm* — PEARL COHEN ZEDEK LATZER BARATZ LLP

(57) ABSTRACT

Systems and methods for three-dimensional (3D) localization of an object, including: a processor, a camera, in communication with the processor, and an X-Ray system, coupled to the camera such that a focal point of the camera is aligned with the source of the X-Ray system, where the X-Ray system is directed towards the object, and wherein the processor is configured to determine 3D localization of the object based on a combination of images received from the camera and from the X-Ray system.

18 Claims, 7 Drawing Sheets

SYSTEM AND METHOD FOR THREE-DIMENSIONAL LOCALIZATION OF AN OBJECT

CROSS REFERENCE TO RELATED APPLICATIONS

This application claims priority from Israeli Patent Application No. IL 292783, filed May 4, 2022, the entire content of which is incorporated herein by reference.

FIELD OF THE INVENTION

The present invention relates to object localization. More particularly, the present invention relates to systems and methods for three-dimensional (3D) localization of objects.

BACKGROUND OF THE INVENTION

In recent years, numerous technological advancements have become available in the field of three-dimensional localization of objects, specifically in cases where there is no direct visual view of the object.

For example, medical equipment can be used in operating rooms to localize small (or miniature) objects within the human body.

Security forces can use dedicated equipment to localize small objects that are not visible, for instance, that are located behind a wall or inside a container (e.g., inside a briefcase). For example, security forces can use an X-Ray machine to check for potential bombs inside the luggage of passengers.

However, the available solutions cannot provide localization of small objects with high accuracy (e.g., in the range of millimeters).

SUMMARY OF THE INVENTION

There is thus provided, in accordance with some embodiments of the invention, a system for three-dimensional (3D) localization of an object, the system including: a processor, a camera, in communication with the processor, and an X-Ray system, coupled to the camera such that a focal point of the camera is aligned with the source of the X-Ray system. In some embodiments, the X-Ray system is directed towards the object, and wherein the processor is configured to determine 3D localization of the object based on a combination of images received from the camera and from the X-Ray system.

In some embodiments, the system is portable.

In some embodiments, real-time combination of images is carried out based on alignment of real-time video feed from the camera and the static X-Ray image from the X-Ray system.

In some embodiments, the system further includes a controllable laser beam configured to be manipulated by the processor based on real-time combined images.

In some embodiments, the system further includes an X-Ray sensor, such that the object is positioned between the X-Ray system and the X-Ray sensor.

In some embodiments, the system further includes an optical mirroring surface at an optical path of the X-Ray system, wherein the X-Ray system includes an X-Ray source and an X-Ray detector, and wherein the optical mirroring surface is configured to: deflect the location of the camera from the optical path of the X-Ray source, and maintain the virtual path of the camera aligned with the optical path of the X-Ray beam forming the X-Ray image.

In some embodiments, the processor is configured to perform image alignment, using computer vision algorithms, of images received from the camera and from the X-Ray system.

In some embodiments, the processor is configured to generate an overlay image based on data from the X-Ray system.

In some embodiments, the overlay image is an augmented reality (AR) image.

In some embodiments, the processor is configured to triangulate the location of the object based on 2D coordinates of the object on at least two different image pairs from the camera and X-Ray images, wherein each image pair is generated at a different position relative to the object.

In some embodiments, the processor is configured to calculate linear 3D transformation of the location of the X-Ray system.

In some embodiments, the camera and the X-Ray system are embedded as a single optical unit.

There is thus provided, in accordance with some embodiments of the invention, a method of three-dimensional (3D) localization of an object, the method including: receiving, by a camera, a first optical image, receiving, by an X-Ray system directed towards the object, a first X-Ray image, wherein a focal point of the camera is aligned with the source of the X-Ray image, moving the camera and the X-Ray system to a different position, receiving, by the camera, a second optical image, receiving, by the X-Ray system, a second X-Ray image, combining, by a processor, the first and second images received from the camera with the first and second images received from the X-Ray system, selecting 2D coordinates of the object on the combined images, and determining, by the processor, 3D localization of the object based on the combined images and based on the selected 2D coordinates.

In some embodiments, combination of images is carried out based on alignment of real-time video feed from the camera and the static X-Ray image from the X-Ray system.

In some embodiments, the X-Ray system includes an X-Ray source and an X-Ray detector, and where the method further includes: deflecting the location of the camera from the optical path of the X-Ray source, using an optical mirroring surface at an optical path of the X-Ray system, and maintaining the virtual path of the camera aligned with the optical path of the X-Ray beam forming the X-Ray image.

In some embodiments, image alignment is performed, using computer vision algorithms, of images received from the camera and from the X-Ray system.

In some embodiments, an overlay image is generated based on data from the X-Ray system.

In some embodiments, the overlay image is an augmented reality (AR) image.

In some embodiments, linear 3D transformation of the location of the X-Ray system is calculated, and the location of the object based on the combined images is triangulated.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
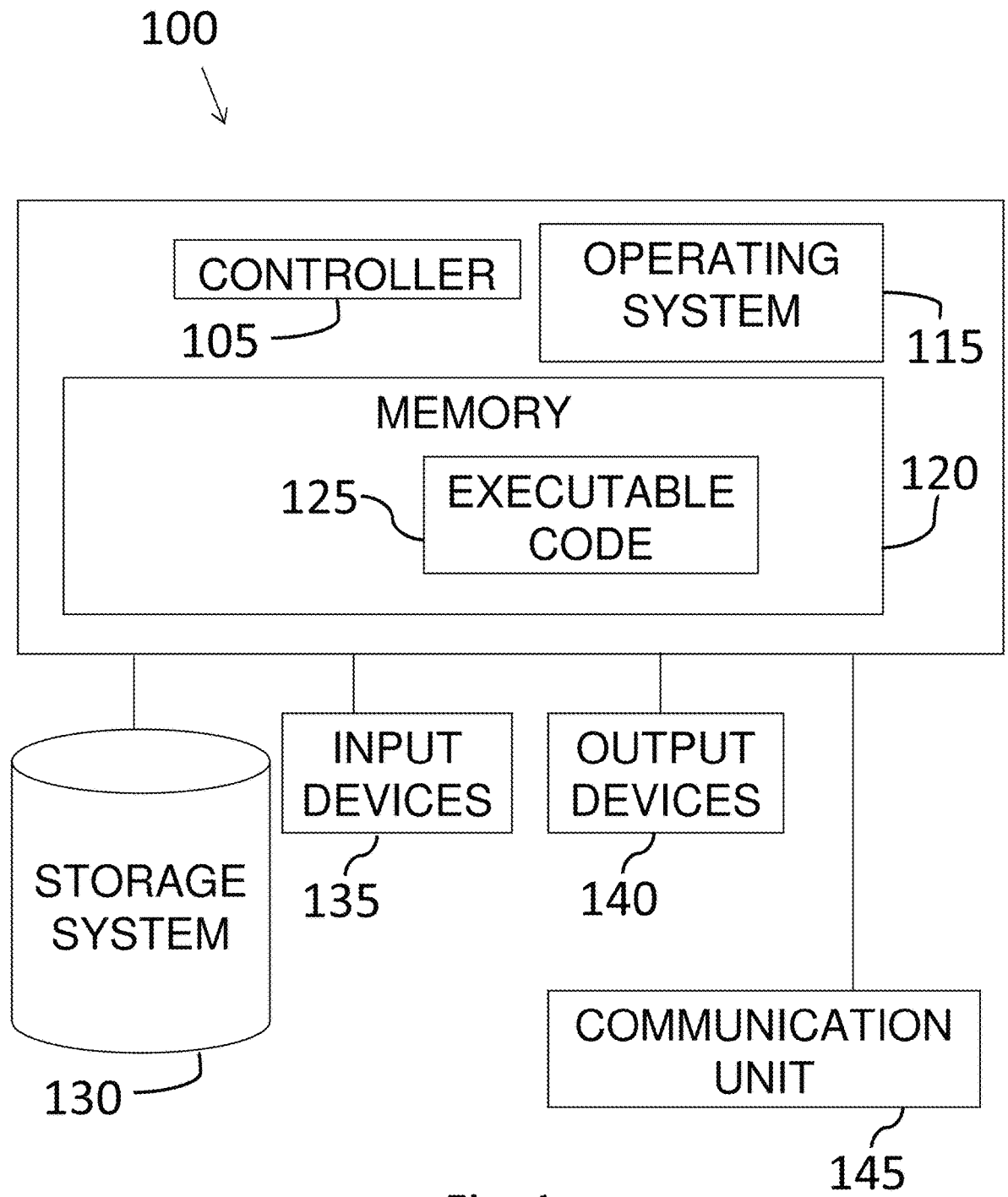
FIG. 1 shows a block diagram of a computing device, according to some embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items.

Unless explicitly stated, the method embodiments described herein are not constrained to a particular order or sequence. Additionally, some of the described method embodiments or elements thereof may occur or be performed simultaneously, at the same point in time, or concurrently.

Reference is made to FIG. 1, which is a block diagram of an example computing device, according to some embodiments of the invention.

Computing device 100 may include a controller or processor 105 (e.g., a central processing unit processor (CPU), a chip or any suitable computing or computational device), an operating system 115, memory 120, executable code 125, storage 130, input devices 135 (e.g. a keyboard or touchscreen), and output devices 140 (e.g., a display), a communication unit 145 (e.g., a cellular transmitter or modem, a Wi-Fi communication unit, or the like) for communicating with remote devices via a communication network, such as, for example, the Internet.

Controller 105 may be configured to execute program code to perform operations described herein. The system described herein may include one or more computing device(s) 100, for example, to act as the various devices or the components shown in FIGS. 2A-2B.

For example, controller 105 may be configured to communicate with a printing device that is connected to the controller 105.

Operating system 115 may be or may include any code segment (e.g., one similar to executable code 125 described herein) designed and/or configured to perform tasks involving coordinating, scheduling, arbitrating, supervising, controlling or otherwise managing operation of computing device 100, for example, scheduling execution of software programs or enabling software programs or other modules or units to communicate.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units.

Memory 120 may be or may include a plurality of similar and/or different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115.

For example, executable code 125 may be a software application that performs methods as further described herein.

Although, for the sake of clarity, a single item of executable code 125 is shown in FIG. 1, a system according to embodiments of the invention may include a plurality of executable code segments similar to executable code 125 that may be stored into memory 120 and may cause controller 105 to carry out methods described herein.

Storage 130 may be or may include, for example, a hard disk drive, a universal serial bus (USB) device or other suitable removable and/or fixed storage unit. In some embodiments, some of the components shown in FIG. 1 may be omitted.

For example, memory 120 may be a non-volatile memory having the storage capacity of storage 130. Accordingly, although shown as a separate component, storage 130 may be embedded or included in memory 120.

Input devices 135 may be or may include a keyboard, a touch screen or pad, one or more sensors or any other or additional suitable input device. Any suitable number of input devices 135 may be operatively connected to computing device 100. Output devices 140 may include one or more displays or monitors and/or any other suitable output devices.

Any suitable number of output devices 140 may be operatively connected to computing device 100. Any applicable input/output (I/O) devices may be connected to computing device 100 as shown by blocks 135 and 140.

For example, a wired or wireless network interface card (NIC), a universal serial bus (USB) device or external hard drive may be included in input devices 135 and/or output devices 140.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

For example, an article may include a storage medium such as memory 120, computer-executable instructions such as executable code 125 and a controller such as controller 105. Such a non-transitory computer readable medium may be for example a memory, a disk drive, or a USB flash memory, encoding, including or storing instructions, e.g., computer-executable instructions, which when executed by a processor or controller, carry out methods disclosed herein.

The storage medium may include, but is not limited to, any type of disk including, semiconductor devices such as read-only memories (ROMs) and/or random-access memories (RAMs), flash memories, electrically erasable programmable read-only memories (EEPROMs) or any type of media suitable for storing electronic instructions, including programmable storage devices.

For example, in some embodiments, memory 120 is a non-transitory machine-readable medium.

A system according to embodiments of the invention may include components such as, but not limited to, a plurality of central processing units (CPUs), a plurality of graphics processing units (GPUs), or any other suitable multi-purpose or specific processors or controllers (e.g., controllers similar to controller 105), a plurality of input units, a plurality of output units, a plurality of memory units, and a plurality of storage units.

A system may additionally include other suitable hardware components and/or software components.

In some embodiments, a system may include or may be, for example, a personal computer, a desktop computer, a laptop computer, a workstation, a server computer, a network device, or any other suitable computing device.

For example, a system as described herein may include one or more facility computing device 100 and one or more remote server computers in active communication with one or more facility computing device 100 such as computing device 100, and in active communication with one or more portable or mobile devices such as smartphones, tablets and the like.

Figure 2A:
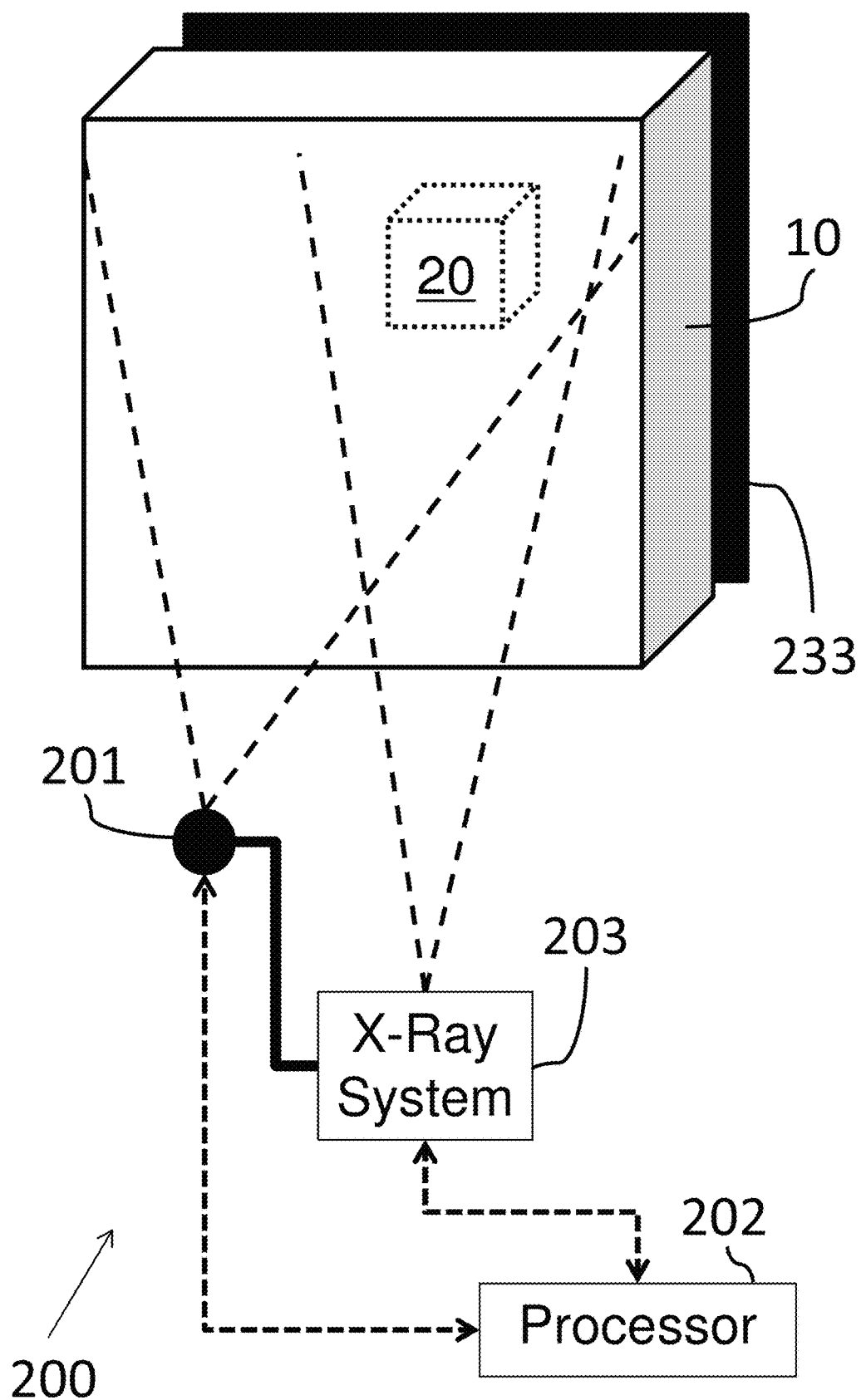
FIG. 2A shows a block diagram of a system for 3D localization of an object, according to some embodiments of the invention.

Reference is now made to FIG. 2A, which shows a block diagram of a system 200 for three-dimensional (3D) localization of an object 20, according to some embodiments.

In some embodiments, the system 200 may be a portable system that enables precise 3D localization in space of external and/or internal portions of the object 20. For example, a portable system may be moved by the operator on site in order to perform imaging from different angles.

For example, when the object of interest 20 is behind or within a confinement 10 (e.g., behind a wall or inside a container) such that the object 20 is not visible from the outside of confinement 10, the system 200 may provide precise penetration to reach the internal portions of the object 20 through calculation of an optimal path (e.g., an optical path) from the outside of the confinement 10.

The system 200 includes a camera 201 (e.g., a video camera) in communication with a processor 202 (e.g., such as computing device 100 shown in FIG. 1).

The system 200 may include an X-Ray system 203, that is coupled to the camera 201 and also in communication with the processor 202.

In some embodiments, the X-Ray system 203 may be any system configured to irradiate the object 20 with Gamma radiography and capture images of the scattered rays. The X-Ray system 203 may include an X-Ray capturing device or sensor (e.g., an X-Ray Flat Panel Detector 233) that is positioned on opposite sides of an X-Ray source with the confinement 10 therebetween. The X-Ray system 203 may also include a dedicated processor to analyze the signals received at the X-Ray capturing device. The X-Ray system 203 may also be replaced by any other system with proactive imaging that irradiates objects such that the rays pass through the objects, for instance utilizing magnetic resonance, in order to provide imaging of hidden objects.

In some embodiments, the X-Ray system 203 may be directed towards the object 20, for instance directed manually by a trained operator, or directed automatically by the processor 202 (e.g., based on image processing).

For example, a portable system 200 may be assembled adjacent to the confinement 10, such that the X-Ray system 203 is directed towards the object 20.

The processor 202 may be configured to determine 3D localization of the object 20 based on a (real-time) combination of images received from the camera 201 and from the X-Ray system 203.

According to some embodiments, the processor 202 may receive input from the camera 201 and/or the X-Ray system 203 for analysis and generation of an overlay image (e.g., using augmented reality) of X-Ray images, from the X-Ray system 203, and real-time optical images, from the camera 201.

In some embodiments, the focal point of the camera 201 is aligned with the source of the X-Ray system 203. In case that the alignment of the focal point of the camera 201 is more accurate, then the 3D localization of the object 20 may be accordingly more accurate as well.

Figure 2B:
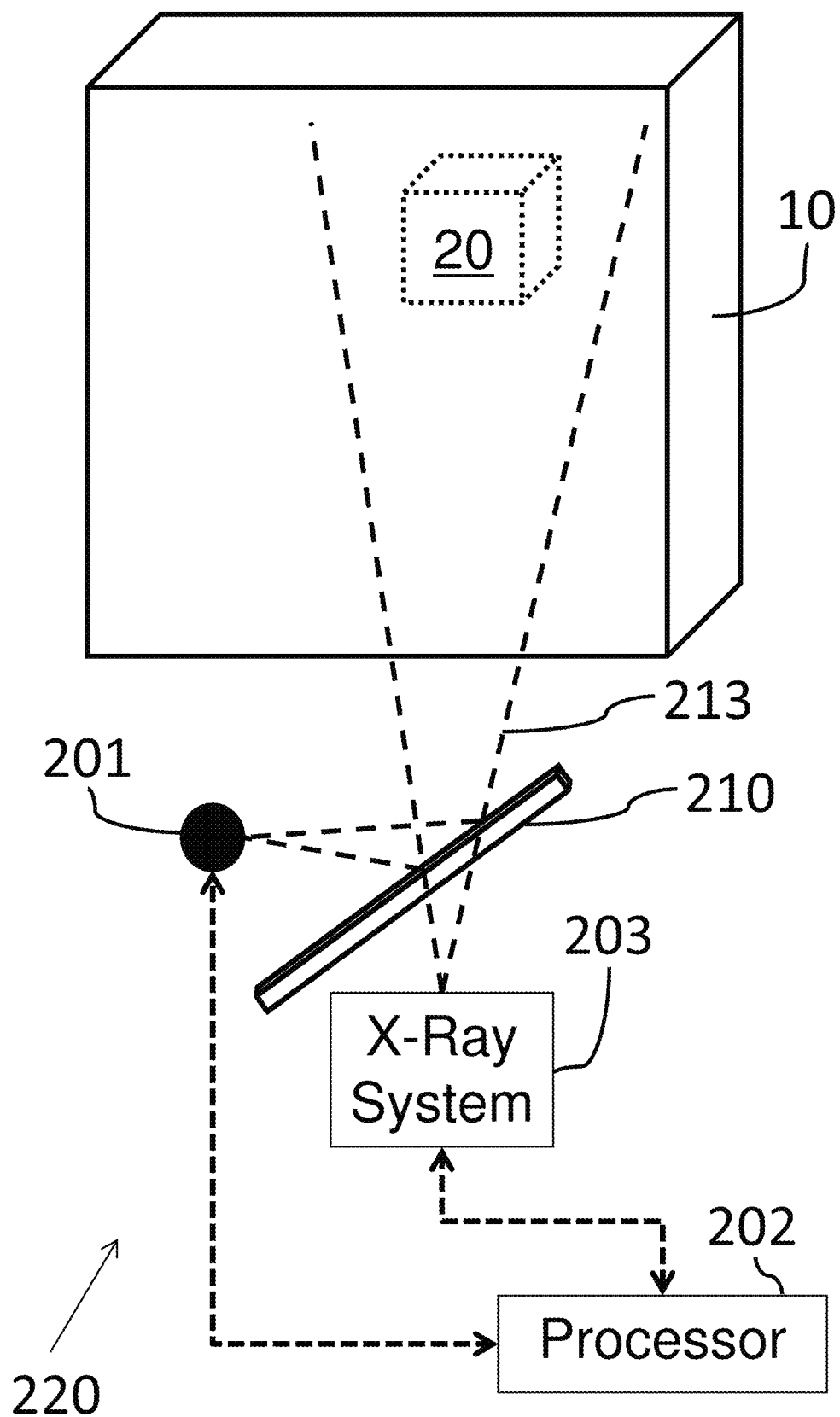
FIG. 2B shows a block diagram of a system for 3D localization with improved optical alignment, according to some embodiments of the invention.

Reference is now made to FIG. 2B, which shows a block diagram of a system 220 for 3D localization of the object 20 with additional optical alignment, according to some embodiments. At least some of the elements in FIG. 2B are similar to the corresponding elements in FIG. 2A, such as the camera 201 or processor 202.

Alignment of the X-Ray imaging (from the X-Ray system 203) with the optical images (from the camera 201), may be accomplished by a dedicated optical system 220 that utilizes a mirroring surface 210.

In some embodiments, the mirroring surface 210 may deflect the optical location of the camera 201 from X-Ray beam 213 path, originating at the X-Ray system 203 (e.g., with an X-Ray source), while keeping the virtual path of the camera 201 aligned with the X-Rays beam 213 paths.

The mirroring surface 210 may also align the virtual optical location of the camera 201 (e.g., virtual location of the camera lens) with the location of the X-Ray focal spot.

According to some embodiments, the processor 202 may carry out dedicated image processing algorithms (e.g., image registration, pattern recognition, and/or utilization of system component parameters) to correct geometrical errors in the alignment of the optical path of the camera 201 with the X-Ray beam 213 paths. Thus, the processor 202 may enable optimal alignment of the X-Ray system with the optical elements in the system 220.

For example, the system 220 may be used in an operating room for surgeries that require high precision (e.g., in the range of millimeters).

The processor 202 may carry out dedicated image processing algorithms for optical environment of surgeries.

In some embodiments, the system 220 may include an X-Ray sensor, such that the object 20 may be positioned between the X-Ray system 203 and the X-Ray sensor.

Figure 3:
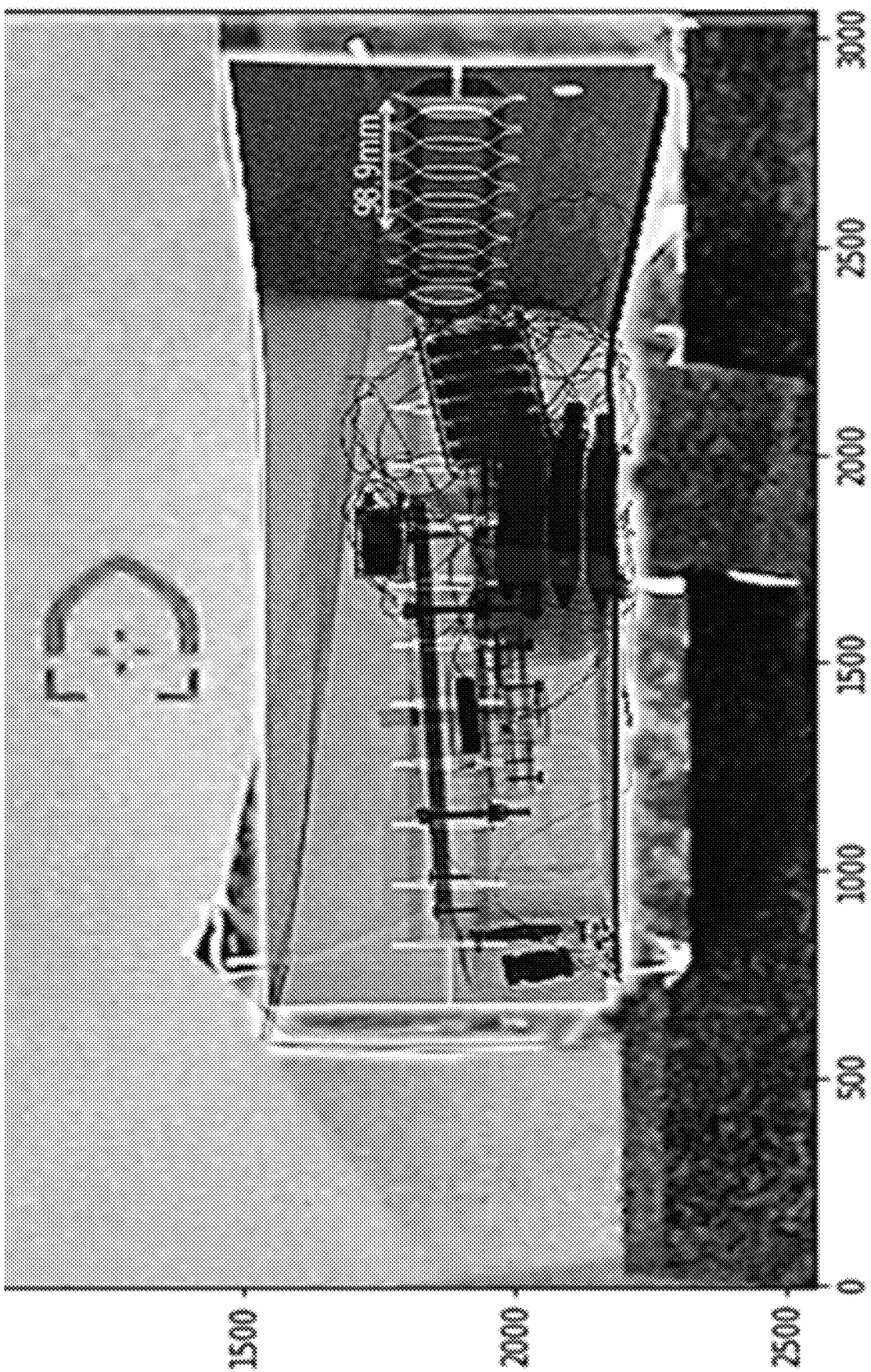
FIG. 3 shows an example of a combined image with input from optical and X-Ray systems, according to some embodiments of the invention.

An example of a combined image (or overlay image) with input from optical and X-Ray systems is shown in FIG. 3, where an object within a package is imaged in order to pinpoint the location of the object with accuracy of millimeters. Such combined images may be created by dedicated algorithms to optimize the correlation (between the optical image and the X-Ray image) and accordingly provide an additional data layer onto X-Ray images that was previously not possible.

Figure 4:
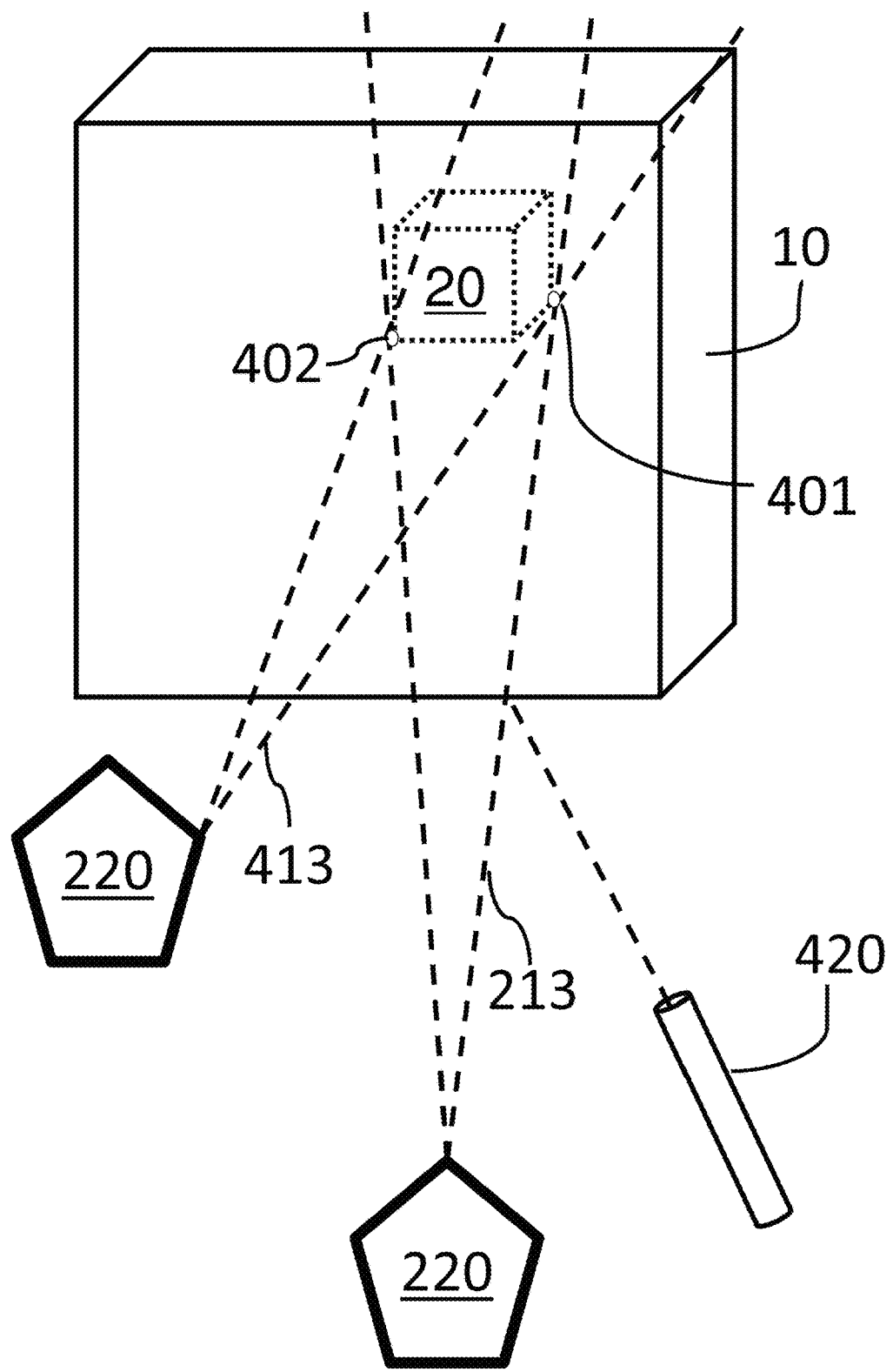
FIG. 4 illustrates a setup for 3D localization of the object using the 3D localization system, according to some embodiments of the invention.

Reference is now made to FIG. 4, which illustrates a setup for 3D localization of the object 20 using the 3D localization system 220, according to some embodiments. In FIG. 4, the system 220 (e.g., as shown in FIG. 2B) is illustrated in a plurality of positions as part of the localization setup process, although only a single system 220 may be required for 3D localization of the object 20.

According to some embodiments, the system 220 may be a portable system and thus easily moved while imaging the object of interest.

According to some embodiments, the system 220 may be portable and moved to at least two physical positions relative to the object 20, where the object 20 is behind or within the confinement 10.

At each position, of the at least two positions relative to the object 20, the system 220 may capture images by the camera 201 and the X-Ray system 203 (e.g., shown in FIGS. 2A-2B).

Thus, at least two image pairs may be collected from different physical positions in order to provide multiple views of the object 20 and/or the confinement 10.

Each image pair may include an optical image from the camera 201 and an X-Ray image from the X-Ray system 203. In some embodiments, the processor 202 may analyze and aggregate multiple input data from the collected image pairs in order to improve accuracy of the 3D localization of the object 20.

For example, the system 220 may be placed in a first position with X-Ray beam 213 towards the object 20, and may later be moved to a second position such that the X-Ray beam 413 is still towards the object 20.

The processor 202 may accordingly capture data for intersection points 401, 402 in order to perform triangulation calculation based on these points 401, 402. For example, the distance between the positions of system 220 may be 10 centimeters.

In some embodiments, the measurements from the different locations are carried out on the same virtual coordinates system (e.g., an arbitrary coordinates system located on the corner of the Flat Panel Detector). Thus, the 3D coordinates of the intersection points 401, 402 may be determined (e.g., separately and/or relatively) in the same coordinates system. From the determined 3D coordinates of the intersection points 401, 402 it may be possible to calculate the distance between these points.

Multiple views of the object 20 may be required in order to minimize concealment of some internal components of the object 20 by other elements such as confinement 10.

For example, the object 20 may be located within the confinement 10 (e.g., within the human body or within a physical object) such that optimal accuracy (e.g., in the range of millimeters) may be achieved only by positioning the system 220 at a particular position that is not known during the initial setup.

In some embodiments, the 3D localization may be achieved by positioning the system 220 at any pair of different positions, such that there is no need to get accurate positioning of the system and any user may operate the system (e.g., following some basic training).

In some embodiments, the collection of images from multiple views may be carried out, manually and/or using a mechanical manipulator, by switching the position of the X-Ray source together with the coupled optical camera.

For example, the camera and the X-Ray system may be embedded in a single optical unit such that in order to collect new input data, it may be sufficient to move only the optical unit (e.g., while the processor and X-Ray Flat Panel Detector of the X-Ray system are not moved).

In some embodiments, 3D localization of the object 20 may be achieved by selection of two-dimensional (2D) points from the collected input images taken from the at least two different positions of the system 220.

For example, a set of at least two 2D images may be selected for the 3D localization. In some embodiments, 3D localization of the object 20 may be achieved by triangulation of the object 20 using the selected 2D images.

According to some embodiments, in order to determine 3D localization of the object 20 based on the collected images, the processor 202 may calculate linear 3D transformation of the location of the camera 201 between the different positions.

The processor 202 may utilize predefined information for the 3D localization, such as parameters of the camera 201 and physical parameters of the system (e.g., dimensions of the X-Ray Imaging Sensor). Thus, the processor 202 may triangulate the selected 2D points for the different positions of the system 220 in order to determine the 3D coordinates in real world length dimensions (e.g., in millimeters, with references to an arbitrary coordinates system).

According to some embodiments, the results of the 3D localization may be used for orientation of robotic systems and/or human operators in order to perform precision operations.

Such precision operations may include At this stage, the barrel may be aimed towards the for example, a robotic arm performing a surgical operation, a device operating in a nuclear reactor where human access is not possible, or a human operator locating internal (critical) parts of an explosive device.

In some embodiments, a laser beam 420 may be used to mark a visible penetration point or trajectory on the confinement 10. Such marking may be useful when the operating on the object 20 once 3D localization is determined.

For example, the laser beam 420 may mark a visible point on the external portion of the confinement 10 for an initial cut in the surgery (e.g., directed towards the path of X-Ray beam 213).

The laser beam 420 may be mechanically and/or manually operated to mark the penetration region. Such marking may be carried out via a feedback system that utilizes the real-time optical images (e.g., video feed from the camera 201) as well as the visible manipulated laser beam.

In another example, the object 20 may be an internal portion of the confinement 10. When the object 20 is a potential bomb that needs to be disabled, it may be possible to penetrate the internal parts of the object 20 using a barrel gun that shoots slags (e.g., to cause a disarm of the device without causing an explosion) towards the marked penetration point and/or by dedicated cutting tools (e g, manipulated by robotic systems or by human operators).

In order to accurately aim the laser beam 420 towards the desired penetration point, the real-time overlaid images (e.g., captured by the camera and X-Ray system) may be utilized to provide dynamic feedback regarding the position of the targets inside the object 20 and the actual position of the laser beam 420.

In some embodiments, for the aiming or marking process, at least the camera 201 should remain at the same position as during collection of the images pair (optical and X-Ray).

For accurate penetration with barrel slags, after the laser marking is completed, the optical unit of the X-Ray and the camera should be removed, and the barrel should be located so that the slag trajectory starting point may be aligned mechanically with the X-Ray focal point. At this stage, the barrel may be aimed towards the point that is marked with the laser beam 420 in order to perform the desired operation.

The 3D localization system may be used to reach any point in the physical space with accuracy of millimeters, even when the object of interest is not visible and/or is blocked by a confinement. According to some embodiments, the 3D localization system may allow calculation of 3D distance measurements between visible points on the external portion of the confinement 10 as well as the non-visible internal part of the object 20.

In contrast to previous solutions where localization of objects is determined based on complicated calculations of angles, depths and known dimensions of the environment, the system according to embodiments of the invention allows determination of 3D localization of the object based on computer vision triangulation between the collected images.

Figure 5:
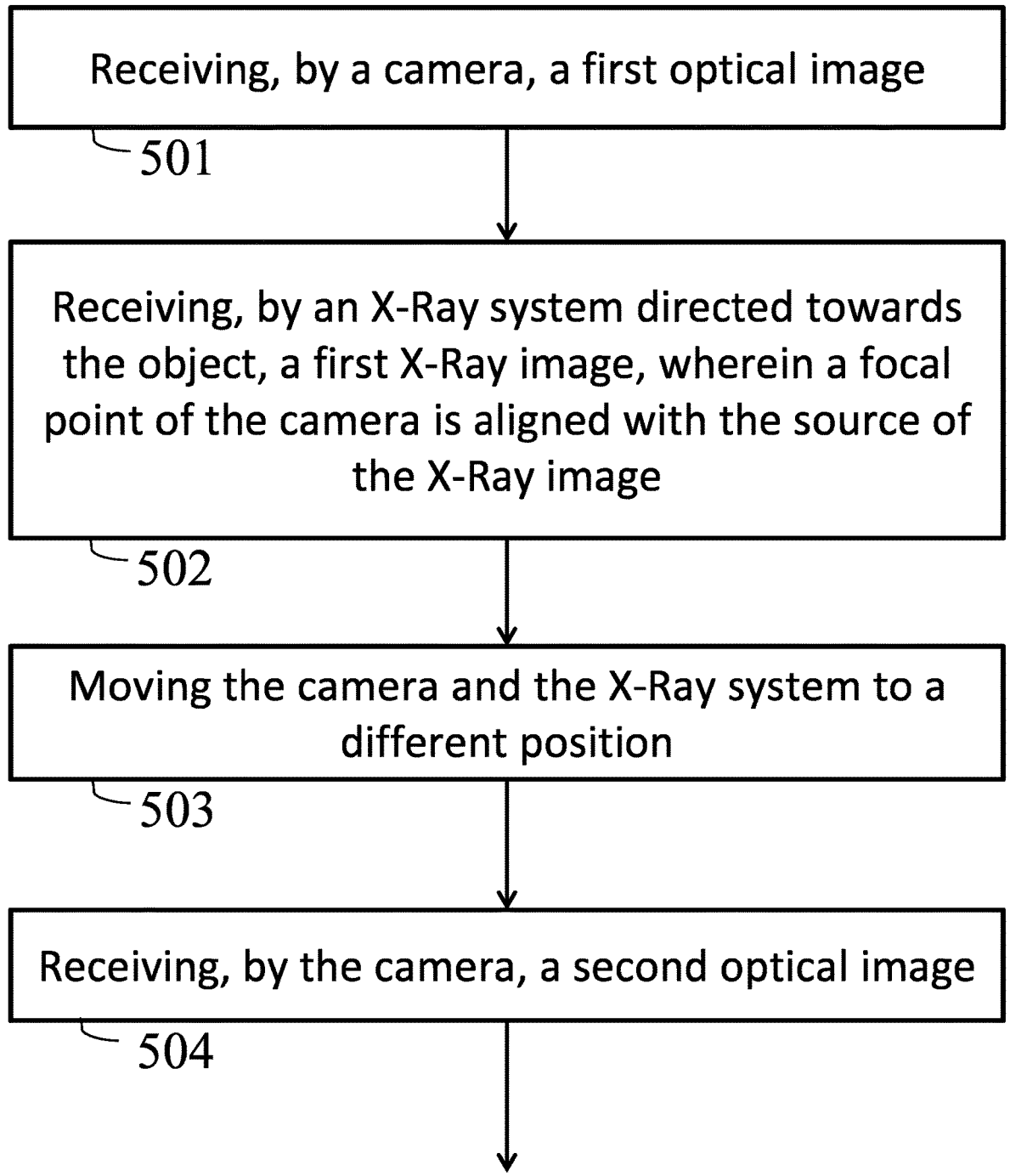
FIG. 5 shows a flowchart of a method of 3D localization of an object, according to some embodiments of the invention.
Figure 5:
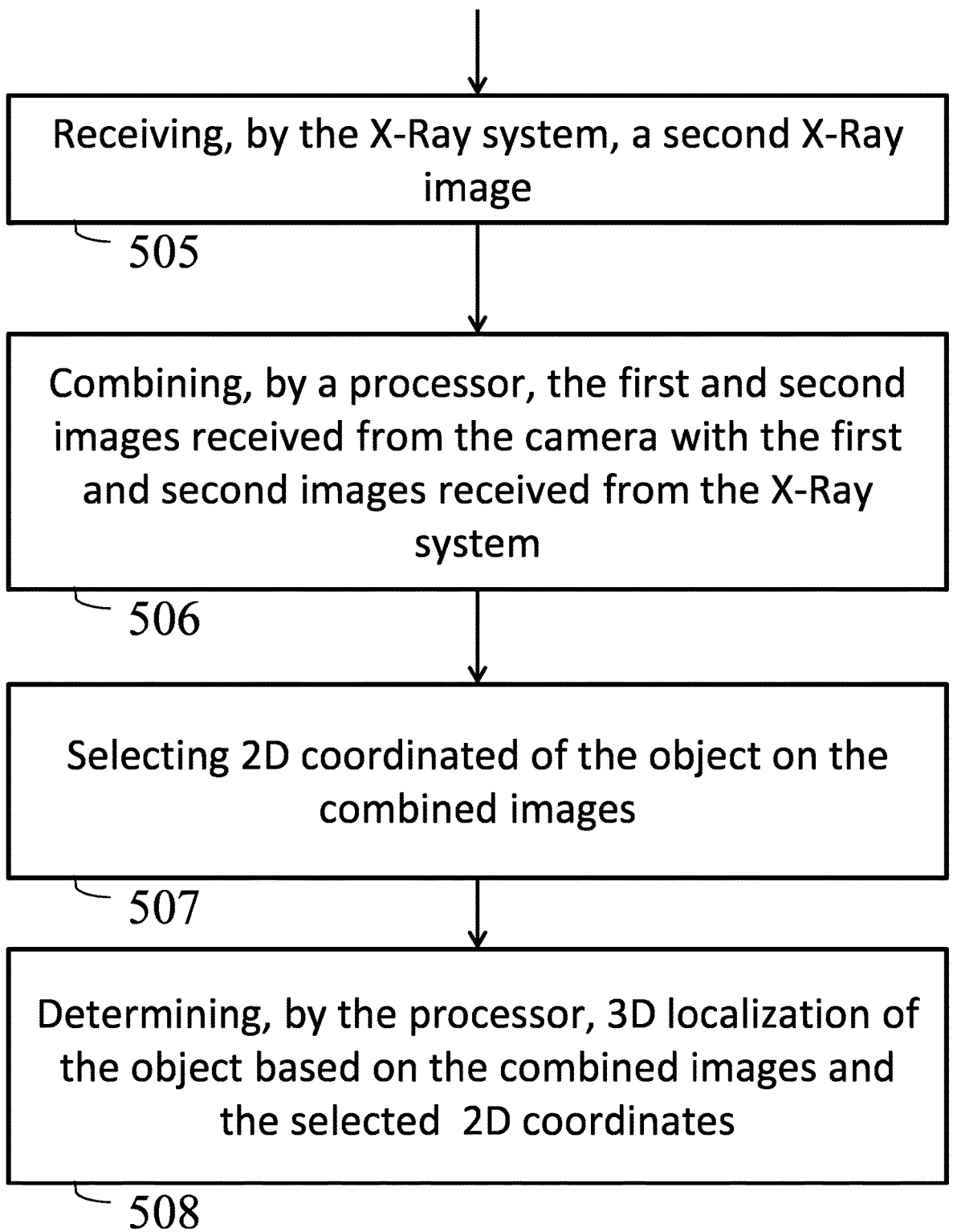

Reference is now made to FIG. 5, which shows a flowchart of a method of 3D localization of an object, according to some embodiments.

In Step 501, a first optical image may be captured (e.g., by the camera). In Step 502, a first X-Ray image may be captured (e.g., by the X-Ray system directed towards the object), where a focal point of the camera is aligned with the source of the X-Ray image.

In Step 503, the camera and the X-Ray system may be moved to a different position. In Step 504, a second optical image may be captured (e.g., by the camera). In Step 505, a second X-Ray image may be captured (e.g., by the X-Ray system).

In Step 506, the first and second images received from the camera may be combined (e.g., by the processor) with the first and second images received from the X-Ray system. In Step 507, 2D coordinates of the object 20 may be selected on the combined images. The selection may be carried out by the operator of system 220, and/or automatically by a dedicated computer vision algorithm.

For example, the selection may be of two 2D coordinates located at corners of the object 20, such that the images of the selected 2D coordinated may be compared from different views (e.g., by moving the system 220).

In Step 508, 3D localization of the object may be determined (e.g., by the processor) based on the selected 2D coordinates on the combined images.

While certain features of the invention have been illustrated and described herein, many modifications, substitutions, changes, and equivalents may occur to those skilled in the art. It is, therefore, to be understood that the appended claims are intended to cover all such modifications and changes.

Various embodiments have been presented. Each of these embodiments may of course include features from other embodiments presented, and embodiments not specifically described may include various features described herein.

The invention claimed is:

1. A system for three-dimensional (3D) localization of an object, the system comprising:
   a processor;
   a camera, in communication with the processor;
   an X-Ray system, coupled to the camera such that a focal point of the camera is aligned with the source of the X-Ray system,
   wherein the X-Ray system is directed towards the object, and wherein the processor is configured to determine 3D localization of the object based on a combination of images received from the camera and from the X-Ray system; and
   an optical mirroring surface, the mirroring surface configured to:
   deflect a location of the camera from an optical path of the source of the X-Ray system; and
   wherein the processor is configured to triangulate a location of the object based on 2D coordinates of the object on at least two different image pairs from the camera and from the X-Ray system, wherein each image pair is generated at a different position relative to the object.

2. The system of claim 1, wherein the system is portable.

3. The system of claim 1, wherein a real-time combination of images is carried out based on an alignment of a real-time video feed from the camera and a static X-Ray image from the X-Ray system.

4. The system of claim 1, further comprising a controllable laser beam configured to be manipulated by the processor based on real-time combined images.

5. The system of claim 1, further comprising an X-Ray sensor, wherein the X-Ray sensor is positioned on an opposite side of the object relative to the X-Ray system.

6. The system of claim 1, wherein the X-Ray system comprises an X-Ray detector, and wherein the optical mirroring surface is configured to:
   maintain the virtual path of the camera aligned with the optical path of the X-Ray beam forming the X-Ray image.

7. The system of claim 1, wherein the processor is configured to perform image alignment, using computer vision algorithms, of images received from the camera and from the X-Ray system.

8. The system of claim 1, wherein the processor is configured to generate an overlay image based on data from the X-Ray system.

9. The system of claim 8, wherein the overlay image is an augmented reality (AR) image.

10. The system of claim 1, wherein the processor is further configured to calculate linear 3D transformation of the location of the X-Ray system.

11. The system of claim 1, wherein the camera and the X-Ray system are embedded as a single optical unit.

12. A method of three-dimensional (3D) localization of an object, the method comprising:
- receiving, by a camera, a first optical image;
- receiving, by an X-Ray system directed towards the object, a first X-Ray image, wherein a focal point of the camera is aligned with the source of the X-Ray image;
- moving the camera and the X-Ray system to a different position;
- receiving, by the camera, a second optical image;
- receiving, by the X-Ray system, a second X-Ray image;
- combining, by a processor, the first and second images received from the camera with the first and second images received from the X-Ray system;
- selecting 2D coordinates of the object on the combined images; and
  - determining, by the processor, 3D localization of the object based on the combined images and based on the selected 2D coordinates; and wherein the method comprises:
  - deflecting, using an optical mirroring surface, a location of the camera from an optical path of the source of the X-Ray system.

13. The method of claim 12, wherein combination of images is carried out based on alignment of real-time video feed from the camera and the static X-Ray image from the X-Ray system.

14. The method of claim 12, wherein the X-Ray system comprises an X-Ray detector, and wherein the method further comprises:
- maintaining the virtual path of the camera aligned with the optical path of the X-Ray beam forming the X-Ray image.

15. The method of claim 12, further comprising performing image alignment, using computer vision algorithms, of images received from the camera and from the X-Ray system.

16. The method of claim 12, further comprising generating an overlay image based on data from the X-Ray system.

17. The method of claim 16, wherein the overlay image is an augmented reality (AR) image.

18. The method of claim 12, further comprising:
- calculating linear 3D transformation of the location of the X-Ray system; and
- triangulating the location of the object based on the combined images.

\* \* \* \* \*